United States Patent
Ledford et al.

(10) Patent No.: US 8,487,472 B2
(45) Date of Patent: *Jul. 16, 2013

(54) GRIP ACTUATED VEHICLE CONTROL SYSTEM

(76) Inventors: Timothy Gerard Ledford, Chino, CA (US); Steven O'Toole Dodson, Kneeland, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/226,359

(22) Filed: Sep. 6, 2011

(65) Prior Publication Data

US 2012/0139336 A1    Jun. 7, 2012

Related U.S. Application Data

(63) Continuation of application No. 12/336,284, filed on Dec. 16, 2008, now Pat. No. 8,022,568, which is a continuation of application No. 11/609,244, filed on Dec. 11, 2006, now Pat. No. 7,466,036, which is a continuation of application No. 10/827,842, filed on Apr. 20, 2004, now Pat. No. 7,176,586.

(60) Provisional application No. 60/491,851, filed on Aug. 1, 2003.

(51) Int. Cl.
    *B60L 1/00* (2006.01)
(52) U.S. Cl.
    USPC .......................................................... 307/9.1
(58) Field of Classification Search
    USPC .......................................................... 307/9.1
    See application file for complete search history.

(56) References Cited

U.S. PATENT DOCUMENTS

| | | | |
|---|---|---|---|
| 3,805,003 A | 4/1974 | Rennels | |
| 3,894,207 A | 7/1975 | Jelley | |
| 4,361,829 A | 11/1982 | Kramholler et al. | |
| 4,497,988 A | 2/1985 | Brown | |
| 4,641,723 A | 2/1987 | Takanashi et al. | |
| 4,710,599 A | 12/1987 | Motodate et al. | |
| 4,847,454 A | 7/1989 | Hiruma | |
| 5,023,592 A | 6/1991 | Schumacher | |
| 5,247,431 A | 9/1993 | Liu | |
| 5,855,144 A | 1/1999 | Parada | |
| 7,176,586 B2 | 2/2007 | Ledford et al. | |
| 7,466,036 B2 * | 12/2008 | Ledford et al. | 307/9.1 |
| 8,022,568 B2 * | 9/2011 | Ledford et al. | 307/9.1 |
| 2003/0121763 A1 | 7/2003 | Mengoli | |

FOREIGN PATENT DOCUMENTS

GB    2256916    6/1992

* cited by examiner

*Primary Examiner* — Robert L. Deberadinis
(74) *Attorney, Agent, or Firm* — Knobbe, Martens, Olson & Bear, LLP

(57) ABSTRACT

Grip actuated control system to provide operational control of vehicle functions at a gripping surface of handlebar equipped vehicles. The system can be provided as original equipment and as an aftermarket addition or replacement for existent vehicle controls. The system includes one or more grip controls positioned adjacent a user's fingertips in a grip or glove assembly which are in communication with a control module. The control module is connected to existent or provided vehicle wiring and thus to respective operational equipment such that user actuation of a grip control induces the control module to provide a corresponding output to activate/deactivate or regulate the operation of the respective vehicle equipment. Communication between the grip controls and control module can be wireless for increased flexibility in installation and placement of the module on the vehicle. Combinations, sequences, and relative timing of the grip controls can provide numerous distinct control functions.

19 Claims, 6 Drawing Sheets

GRIP ACTUATED VEHICLE CONTROL SYSTEM

RELATED APPLICATIONS

This application is a continuation of U.S. patent application Ser. No. 12/336,284, filed Dec. 16, 2008, which is a continuation of U.S. patent application Ser. No. 11/609,244, filed Dec. 11, 2006, now U.S. Pat. No. 7,466,036, which is a continuation of U.S. patent application Ser. No. 10/827,842, filed Apr. 20, 2004, now U.S. Pat. No. 7,176,586, issued Feb. 13, 2007, which claims the benefit of the U.S. provisional application 60/491,851 filed Aug. 1, 2003.

BACKGROUND OF THE INVENTION

1. Field of the Invention

The invention relates to the field of motor vehicles and more particularly to a system for fitting electrical controls into grip regions of the vehicle to allow an operator to actuate the controls without removing their fingers from the grip regions.

2. Description of the Related Art

Many types of motor vehicles, including motorcycles, motor scooters, mopeds, personal watercraft, and all-terrain vehicles (ATVs) include handlebar-type steering controls. A handlebar-type steering control is one in which a user or rider grasps a generally tubular handlebar connected to steering or suspension mechanisms to provide steering input to the vehicle. Handlebars include both bar-type handlebars generally formed from straight or tapered portions of tubing, shaped or bent to form a desired configuration, as well as clip-on type bars which generally include separate left and right hand assemblies fixed to the steering or vehicle suspension mechanisms.

In addition to providing steering inputs to the vehicle, handlebars also provide a significant support and retention function for the rider/user by providing a grasping structure for the rider against which to brace or hold themselves against the dynamic forces of braking, turning, and acceleration. Further, in many handlebar applications, the handlebars also provide a significant weight-bearing portion of the vehicle as a significant portion of the user's weight, particularly the upper torso and arms is borne upon the handlebars, such as in sport bike type motorcycles. In certain applications, such as in exhibition or competition riding, a rider or user applies a pulling force to the handlebars to shift the combined rider and vehicle weight rearward typically with simultaneous application of an acceleration force to unload the front end of the vehicle, such as to perform a jump or wheelie maneuver.

As the user's hands are typically respectively placed on opposite ends of the handlebar during operation of the vehicle, handlebars are a preferred mounting location for various vehicle controls as the user's hands and fingers typically having the greatest dexterity and fine motor control are positioned there during operation of the vehicle. Typical vehicle controls include actuation levers for hydraulic or cable operated controls, such as brakes and clutches, actuation of the vehicle throttle, and actuation of various electrical controls typically controlled by switches, such as starter activators, turn indicators, horn, lights and the like. Handlebars are typically provided with handgrips positioned at opposed ends of the handlebars and are typically formed from a resilient material having a relatively high coefficient of friction, such as rubber or foam, to provide a secure gripping surface for the user's hands, as well as providing shock absorption against vehicle vibration and/or shocks caused by impact with the surface upon which the vehicle travels. Grips may be either fixed in place on the handlebar or rotatably mounted thereto, such that rotation of the grip with respect to the handlebar can provide a control input, such as providing throttle control. The electrical switches and other control levers are typically positioned adjacent yet separate from the grips, such that by extending their fingers or thumbs, an operator can actuate the switches or other controls while maintaining partial grasp of the grip and handlebar. However, known configurations of vehicle controls provided on a handlebar have certain disadvantages, particularly with respect to maintaining secure control of the vehicle.

In particular, as the user's grasp of the handlebar is a significant contributor to maintaining safe control of the vehicle, it is strongly preferred that an operator maintain a secure grasp of both ends of the handlebars at all times during operation. A motorcycle, for example, has only a single wheel and tire providing steering and directional control of the vehicle. The wheel and tire assembly of a motorcycle is also directly coupled to the handlebar rather than via an interconnecting steering rack or steering gear box as in a typical passenger car or truck. Thus, any impact of a motorcycle front wheel with a pothole, rock, or other surface discontinuity can introduce a significant twisting or jarring motion transmitted through the motorcycle to the handlebar which can cause the operator to lose grasp of the grip or grips. As an operator of vehicles provided with handlebars typically sits on rather than within the vehicle, losing the grasp of the handlebar can readily lead to the operator becoming separated from the vehicle. As the operator lacks the protective encasement of a closed vehicle, the risk of injury and death in such circumstance is evident.

However, the typical configuration and arrangements of vehicle controls as fitted to vehicles with handlebars introduces possibilities for just such accidents. In particular, the aforementioned controls and switches are typically positioned adjacent yet separate from the actual gripping surface of the handlebars. For example, control levers are typically pivotably mounted via a perch to the handlebar, such that a user must extend one or more fingers to wrap around the lever, apply a flexing motion with their fingers so as to draw the control lever into adjacency with the handlebar so as to tension a control cable or operate a master cylinder of a hydraulic control. Similarly, electrical controls, such as switches and buttons, are also positioned in switch housings typically secured to the handlebar and positioned at an inboard end of the grip, such that to operate the switches or buttons, a user extends a thumb or index finger to operate the respective control. It will be appreciated that by extending fingers or thumbs, to operate these vehicle controls, a user compromises a full enclosing grasp of the respective handlebar grip while performing the control operation. This frequently results in the circumstance that while performing a vehicle operation indicating utmost control of the vehicle, such as indicating and initiating a turn or applying braking force requiring counter acting arm bracing, an operator is obligated to compromise the firm grasp of the handlebars while performing this maneuver. Experienced riders and operators become familiar with the required movements to perform such maneuvers in a relatively safe manner, however, the limitations forced by known vehicle operational controls at best compromise to some degree the safety and total control of the vehicle operation during such maneuvers.

From the foregoing, it will be appreciated that there is a need for a vehicle control system compatible with handlebar-type steering controls that would enable a user to manipulate operational controls of the vehicle without compromising their firm grasp of the handlebars throughout operation of the vehicle. There is a need for such a system to be retrofitted to existing vehicles in a cost effective and easy to install manner. There is a need for such a system to be universal, e.g., to be compatible with a wide variety of different makes and models of vehicles with handlebar controls. There is also a need for such a system to be unobtrusive in installation so as not to negatively impact the designed aesthetics of the vehicle. There would also be significant utility in a system which could provide additional control functionality over and above that provided by the original manufacturer, particularly if provided in a cost effective, easy to install and unobtrusive manner.

SUMMARY OF THE INVENTION

The aforementioned needs are satisfied by the invention which in one embodiment is a vehicle control system for a vehicle having handle-bar steering controls and existent vehicle control wiring, the vehicle control system comprising a grip assembly configured to be fitted to the handle-bars wherein the grip assembly comprises one or more grip controls and a control module in communication with the grip assembly and with the existent vehicle wiring such that actuation of the one or more grip controls induces the control module to provide corresponding control signals to the existent vehicle wiring so as to control corresponding operational aspects of the vehicle.

One embodiment further comprises a wireless communication system in communication with the grip assembly and the control module such that the communication between the grip assembly and the control module occurs via the communication system in a wireless manner.

In one embodiment, the grip assembly comprises a generally tubular grip structure with the one or more grip controls arranged within the grip structure such that grip structure inhibits unintentional actuation of the grip controls by a user grasping the grip assembly. In one specific implementation, the grip structure can further comprise a grip housing defining a central opening configured for attachment to the vehicle handle bars and defining one or more external cavities corresponding to the one or more grip controls and a resilient grip cover covering the grip housing and the one or more cavities so as to define a grip surface wherein the grip control is positioned within the corresponding cavity and covered by the grip cover so as to be recessed below the grip surface such that the grip control is responsive to local pressure applied to the grip surface at the grip control and is resistant to actuation by dispersed pressure applied across the grip surface by a user grasping the grip assembly.

In one embodiment, the grip assembly comprises a first and a second grip member. In one embodiment, at least one of the first and second grip members is configured to be rotatably attached to the vehicle handle-bars.

In one embodiment, the one or more grip controls comprises a switch. The switch can toggle the respective operational aspect of the vehicle and/or provide at least a first signal to the control module within a first time window and wherein the grip control is determined by at least one of a count of a number of signals provided by the switch within the first time window and an interval between successive signals.

In one embodiment, the operational aspect of the vehicle comprises turning on a turn indicator. In one embodiment, simultaneously actuating different combinations of a plurality of the grip controls induces the control module to provide corresponding different control signals to the existent vehicle wiring so as to control corresponding different operational aspects of the vehicle. In one embodiment, actuating a plurality of the grip controls in different orders induces the control module to provide corresponding different control signals to the existent vehicle wiring so as to control corresponding different operational aspects of the vehicle.

Another embodiment is a grip control assembly for a motor vehicle having handle-bar steering controls wherein the grip control assembly is configured to be fitted to the handle-bars and defines a gripping surface where an operator grasps the handle-bars and attached grip control assemblies and wherein the grip control assembly comprises one or more grip controls arranged along the gripping surface such that actuation of the grip control generates a signal to change an operational aspect of the vehicle.

In one embodiment, the one or more grip controls are recessed under the gripping surface so as to inhibit unintentional actuation of the grip control by the operator grasping the grip assembly. In one embodiment, the grip controls are positioned to be adjacent the operator's fingertips when grasping the grip control assembly and/or one or more grip controls comprise a switch.

A further embodiment is a vehicle control system for a vehicle having existent vehicle control wiring, the vehicle control system comprising a glove assembly comprising one or more grip controls and a control module in communication with the glove assembly and with the existent vehicle wiring such that actuation of the one or more grip controls induces the control module to provide corresponding control signals to the existent vehicle wiring so as to control corresponding operational aspects of the vehicle.

In one embodiment, the vehicle comprises a vehicle having handlebar steering controls.

One embodiment comprises the vehicle having a steering control wherein the glove assembly comprises a glove member and one or more switches attached to the glove member at one or more contact regions such that, while gripping the steering control, user flexion of a corresponding finger induces the corresponding switch to be actuated via compression between the steering control and the finger.

In one embodiment, the glove assembly is configured to communicate with multiple separate control modules fitted to corresponding vehicles such that a single glove assembly can function with the multiple control modules and vehicles. In one embodiment, the communication between the glove assembly and the control module comprises a wireless communication link.

DETAILED DESCRIPTION OF THE PREFERRED EMBODIMENT

Figure 1:
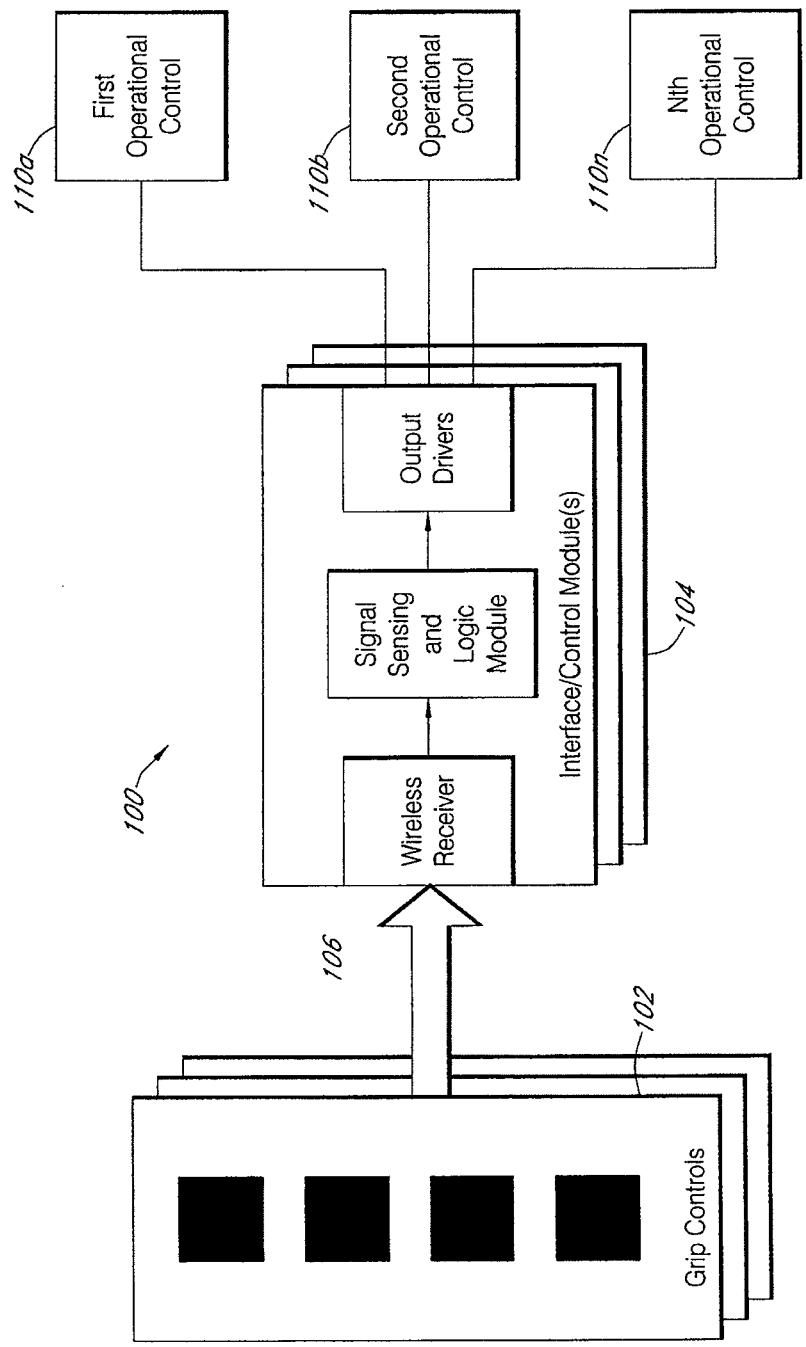
FIG. 1 is a functional block diagram of embodiments of a vehicle grip control system.

Reference will now be made to the drawings wherein like reference designators refer to like parts throughout. FIG. 1 illustrates a functional block diagram of a grip control system 100 which is adapted to be fitted either as original equipment or as an aftermarket upgrade to an existing motor vehicle employing a handlebar-type steering control. The grip control system 100 comprises one or more grip controls 102 which are positioned along a gripping surface of a handlebar grip in a manner so as to allow user actuation of the grip controls 102 while still maintaining a firm fully encircling grasp of the handlebars and grips thereof. In this embodiment, the grip control system 100 also comprises an interface or control module 104. The control module 104 is in communication with the grip controls 102 so as to receive signals therefrom. In this embodiment, the system 100 includes a wireless communication link 106 providing wireless communication between the grip controls 102 and the control module 104. In other embodiments, the system comprises an interconnecting cable 218 (FIG. 2) providing wired communication between the grip controls 102 and the control module 104.

Upon receipt of a control signal from one or more of the grip controls 102, the control module 104 generates a corresponding control signal to effectuate a corresponding first 110*a*, second 110*b* through Nth 110*n* operational control of the vehicle. These operational controls 110*a*-110*n* provide functional control of a corresponding operational aspect of the vehicle. The operational controls 110*a*-110*n* can comprise application or interruption of operating electrical power to illuminate, for example, a headlight beam or a starter motor. The operational control 110*a*-110*n* may also comprise providing an operating voltage and current in an intermittent fashion, such as to provide intermittent electrical power to operate a blinking turn indicator. The operational controls 110*a*-110*n* may also comprise providing a variable voltage or variable resistance element in a circuit to provide a multi-level control signal to, for example, adjust a volume level of a stereo receiver.

In one embodiment, operation of the grip controls 102 induces the control module 104 to actuate the corresponding operational control 110*a*-110*n* in an on/off or toggle fashion, such that a first actuation of the grip controls 102 activates a corresponding functional aspect of the vehicle, and a subsequent second actuation of the grip control 102 induces the control module 104 to toggle the corresponding operational control 110*a*-110*n* off. In another embodiment, the grip controls 102 are communicated to the control module 104 via the wireless interface 106, such that the control module 104 provides a corresponding operational control 110*a*-110*n* in accordance with a count and/or duration of activation of the grip control 102. In one embodiment, a single activation of a grip control 102 induces the control module to activate a first operational control 110*a* and two activations of the grip control 102 induces the control module 104 to activate a second operational control 110*b*. In another embodiment, activation of the grip control 102 for a first time period induces the control module 104 to effectuate the first operational control 110*a* and activation of the grip control 102 for a second different time period induces the control module 104 to effectuate a second operational control 110*b*. In yet another embodiment, the control module 104 provides the operational controls 110*a*-110*n* in accordance with a detected interval between subsequent applications of the grip control 102. Thus, in this embodiment, rapid subsequent actuation of the grip control 102 induces the control module 104 to actuate the first operational control 110*a*, whereas successive actuations of the grip controls 102 but at a longer interval, such as an interval in excess of a predetermined threshold induces the control module 104 to operate the second operational control 110*b*.

In a further embodiment, the grip controls 102 are considered in combination, such that actuation of a first grip control 102 results in a first operational control 110*a*, actuation of the first and a second grip control simultaneously results in actuation of the second operational control 110*b*, and simultaneous actuation of the second and a third grip control 102 result in actuation of the Nth operational control 110*n*. Thus, by providing the capability for a plurality of grip controls 102 to operate independently and in combination and in a manner in which different combinations, relative timing of actuation, order of actuation, and/or count of successive actuation of the grip controls 102 provides the capability for the system 100 to provide a relatively large number of distinct operational controls 110*a*-110*n* with a relatively small number of separate grip controls 102.

Figure 2:
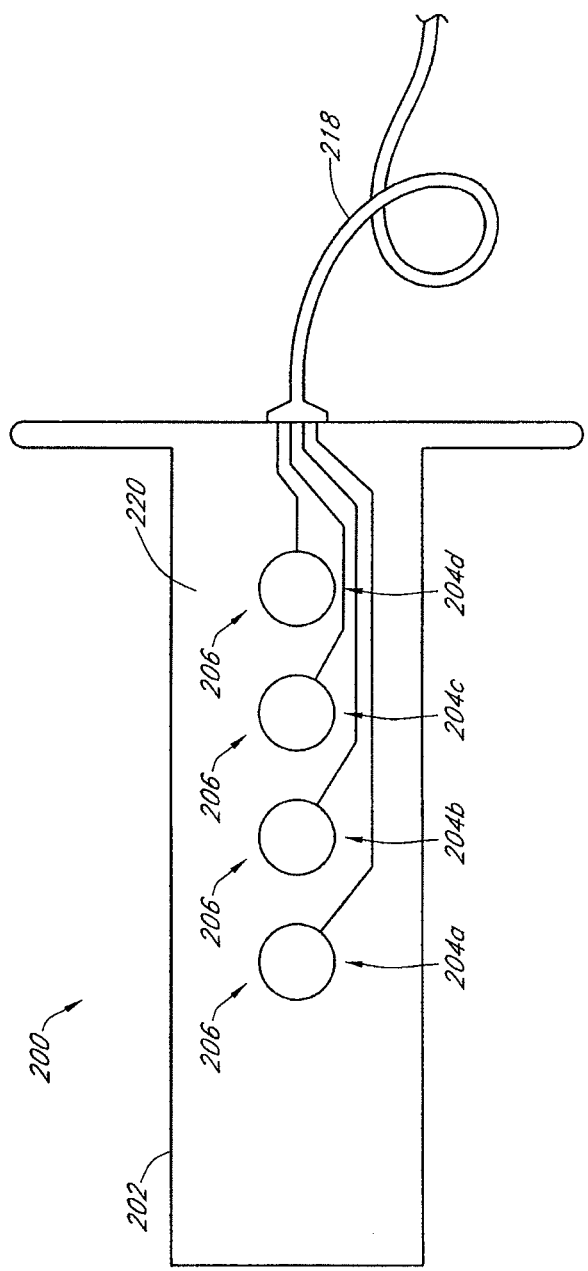
FIG. 2 illustrates in partial section one embodiment of a grip control assembly.

FIG. 2 is a partial section view of one embodiment of a grip control assembly 200. The grip control assembly 200 is configured for fitment to a standard vehicle handlebar, such as a standard bar-type handlebar or clip-on type handlebar. In one embodiment, the grip control assembly 200 is configured for a substantially fixed attachment to the handlebar and in another embodiment, the grip control assembly 200 is configured to be rotatably attached to the handlebar allowing provision for a combination of the grip control assembly 200 with other vehicle controls, such as a twist throttle.

The grip control assembly 200 comprises a grip housing 202 and, in this embodiment, four grip controls 204*a*, 204*b*, 204*c*, and 204*d*. The grip controls 204*a*-204*d* comprise a plurality of microswitches or membrane switches 206 of types well known in the art and commercially available. The switches 206 are sized and configured to be readily actuated by localized finger pressure. The switches 206 are connected via a plurality of conductive wires in combination comprising the interconnecting cable 218 for connection to the control module 104. Thus, user actuation of a corresponding switch 206 via the interconnecting cable 218 is communicated to the control module 104, thereby providing the corresponding grip control 204*a*-204*d* signal.

As illustrated in FIG. 2, the grip controls 204*a*-204*d* comprise a corresponding plurality of switches 206 arranged in this embodiment in a substantially linear manner along the major axis of the grip housing 202 and positioned along an outer gripping surface 220 (FIG. 4) of the grip control assembly 200. This embodiment of the grip control assembly 200 provides the advantage of left-right symmetry such that the grip control assembly 200 can be readily fitted to either the left or right side of a handlebar in a symmetrical manner.

Figure 3:
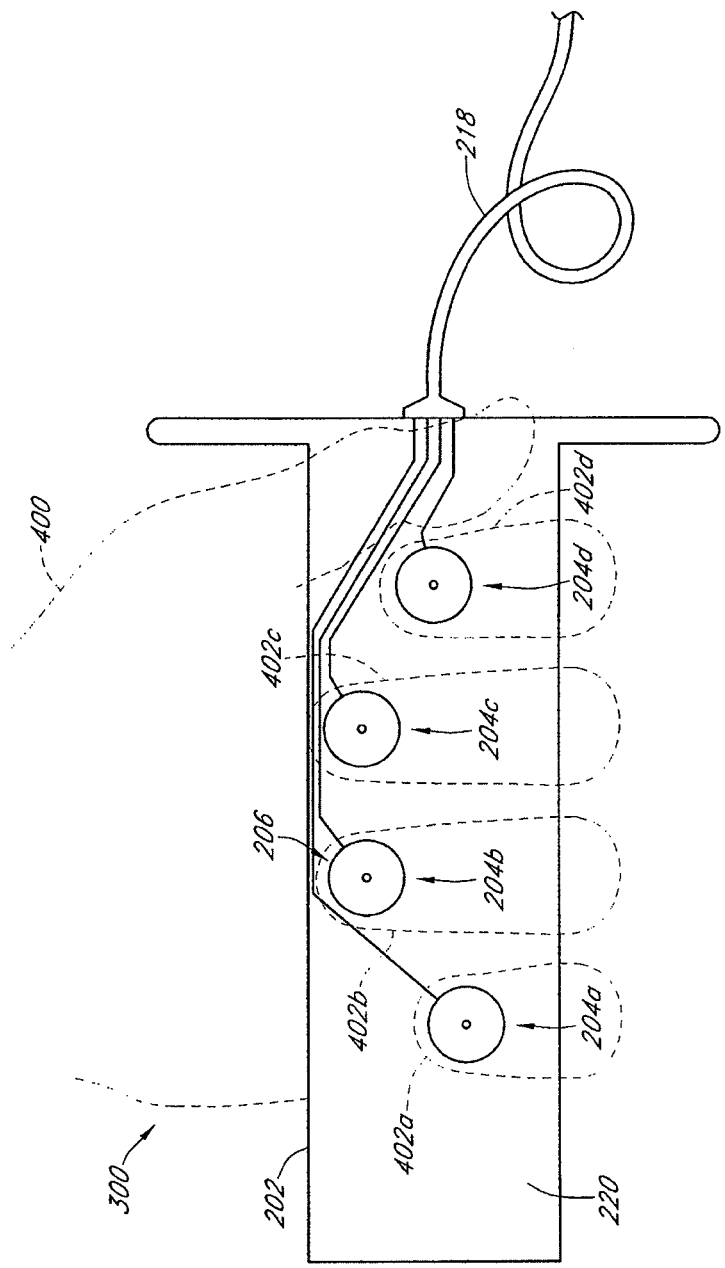
FIG. 3 illustrates in partial section another embodiment of a grip control assembly with an operator's hand shown in phantom.

An asymmetric embodiment is illustrated for the grip control assembly 300 as shown in FIG. 3. In this embodiment, the grip controls 204*a*-204*d* also comprising a corresponding plurality of switches 206 interconnected via conductive wires to the interconnecting cable 218. But with the plurality of switches 206 and the corresponding grip controls 204*a*-204*d* arrayed within the grip housing 202 and along the gripping surface 220 in such a manner that the individual grip controls 204*a*-204*d* fall naturally under the fingertips 402*a*-402*d* of the hand 400 of a user grasping the grip control assembly 300. In particular, in this embodiment, the grip control assembly 300 has the individual grip controls 204*a*-204*d* arrayed about the gripping surface 220 so as to be spaced both axially and radially about the surface 220 such that the user's fingertips 402*a*-402*d* are naturally positioned on top of the respective switches 206 such that a relatively slight flexure of the fingertip 402*a*-402*d* applies localized pressure to the respective switch 206 so as to actuate the respective grip control 204*a*-204*d* without requiring that the user or operator disturb their natural grasp of the handlebars of the vehicles as provided with the grip control assembly 300. The embodiment of grip control assembly 300 illustrated in FIG. 3 is configured for left hand operation and it will be readily understood that a substantially mirror image configuration of the grip controls 204a-204d can be provided in a right hand configuration for fitment to the right hand side of the handlebars. Again, the grip control assembly 300 can be configured for substantially fixed attachment to a handlebar or for rotatable attachment to a handlebar to provide combination of the grip control assembly 300 with rotary controls of the vehicle such as a twist throttle.

Figure 4:
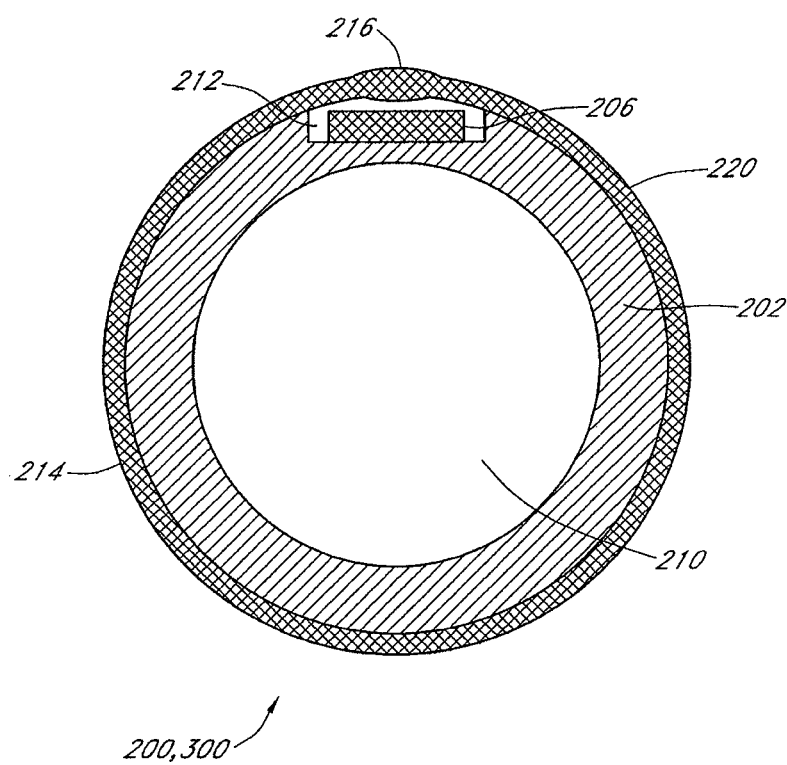
FIG. 4 is an end section view of grip control assembly embodiments of FIG. 2 or 3.

FIG. 4 illustrates an end section view of the grip control assembly 200, 300. As can be seen, the grip control assemblies 200, 300 comprise the grip housing 202 which is a generally cylindrical structure having a centrally located opening 210 configured for attachment to the handlebars of the vehicle. The grip housing 202 preferably comprises a relatively strong weather resistant material such as plastics or rubber. The grip housing 202 also defines a recess or cavity 212 which is configured to receive and retain the switch 206. A grip cover 214 covers the grip housing 202 and the cavity 212 with the switch 206 positioned therein. The grip cover 214 comprises a tough resilient material preferably also weather-resistant such as rubber or foam. The grip cover 214 defines a gripping surface 220 positioned about the outer periphery of the grip cover 214 providing a relatively high coefficient of friction gripping surface 220 for a user so as to provide a secure surface with which to grasp and control the vehicle. It can be seen that the cavity or recess 212 allows the switch 206 to lie below the gripping surface 220 however in such a manner that a localized pressure, such as provided by a user's fingertips 402a-402d, can readily actuate the switch 206. However more dispersed pressure, such as from a user grasping a broader portion of the gripping surface 220 by the routine grasping of the handlebar inhibits application of pressure to the switch 206 via the clearance provided by the cavity 212.

In this embodiment, the grip cover 214 also comprises a contour 216 which is positioned adjacent the switch 206 and cavity 212. In this embodiment, the contour 216 comprises a slightly enlarged or thicker portion of the grip cover 214. In this embodiment, the contour 216 provides both a slightly raised or otherwise contoured region of the grip cover 214 to provide additional tactile sensation to the operator to confirm proper placement of their fingertips 402a-402d with respect to the switch 206 and cavity 212. This facilitates tactile determination of proper placement of the fingertips 402a-402d for actuation of the grip controls 204a-204d even when the user is wearing protective gloves. The enlargement of the grip cover 214 at the contour 216 also reduces the amount of deformation necessary as provided by finger pressure applied at the grip control 204a-204d to actuate the respective switch 206. The resilient nature of the grip cover 214 also provides the advantage of facilitating temporary actuation of the switch such that the corresponding grip control 204a-204d is activated while the operator applies pressure adjacent the switch 206, however, when the pressure is removed, the resilient nature of the grip cover 214 is such as to induce the grip cover 214 in the region of the switch 206 back to a relaxed position, e.g., so as to remove actuation of the switch 206.

Figure 5:
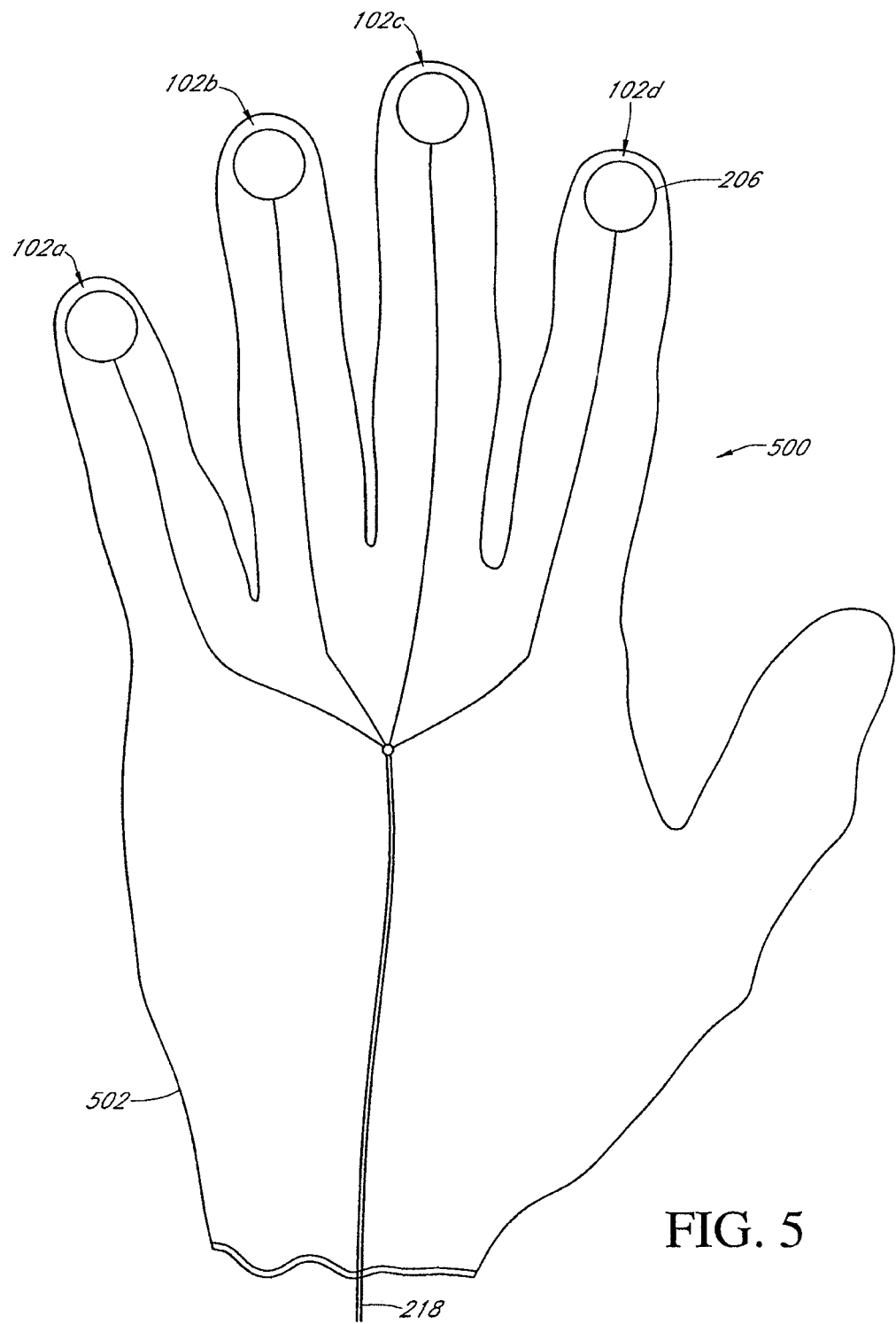
FIG. 5 illustrates one embodiment of a glove control assembly.

FIG. 5 illustrates an embodiment of a glove control assembly 500 which provides another embodiment of grip controls 102 usable with the system 100. The glove control assembly 500 comprises a glove member 502 which, in this embodiment, is a well known leather or high strength synthetic material protective glove of types well known in the art and commercially available for protection and user comfort when operating a handlebar equipped vehicle such as a motorcycle. Within the glove member 502 are incorporated a plurality of switches 206 secured at the distal ends of the finger portions of the glove member 502 so as to provide in this embodiment for grip controls 102a-102d. Similarly, to the embodiments previously described for the grip control assemblies 200, 300, the glove control assembly 500 also comprises a plurality of conductive wires communicating via an interconnecting cable 218 to the control module 104.

The glove control assembly 500 provides the advantage that a user may incorporate the grip controls 102a-102d within a glove member 502 that is specifically adapted for their particular needs. For example, the glove member 502 can comprise a custom-fitted glove or one particularly adapted for particular applications, such as racing or wet and cold weather use. The glove control assembly 500 also has the utility of not being built into the structure of a particular vehicle. Thus, the glove control assembly is portable among a plurality of different vehicles such that a user can purchase or have fitted a single set of glove control assemblies 500 in a plurality of corresponding control modules 104, have the control modules 104 fitted to a corresponding plurality of separate vehicles and by respective disconnection and connection to a vehicle for use, employ the system 100 as described herein to advantage with reduced material investment and installation. The different vehicles can vary in type and include passenger cars, commercial trucks, construction equipment, forklifts, farming equipment, etc.

Figure 6:
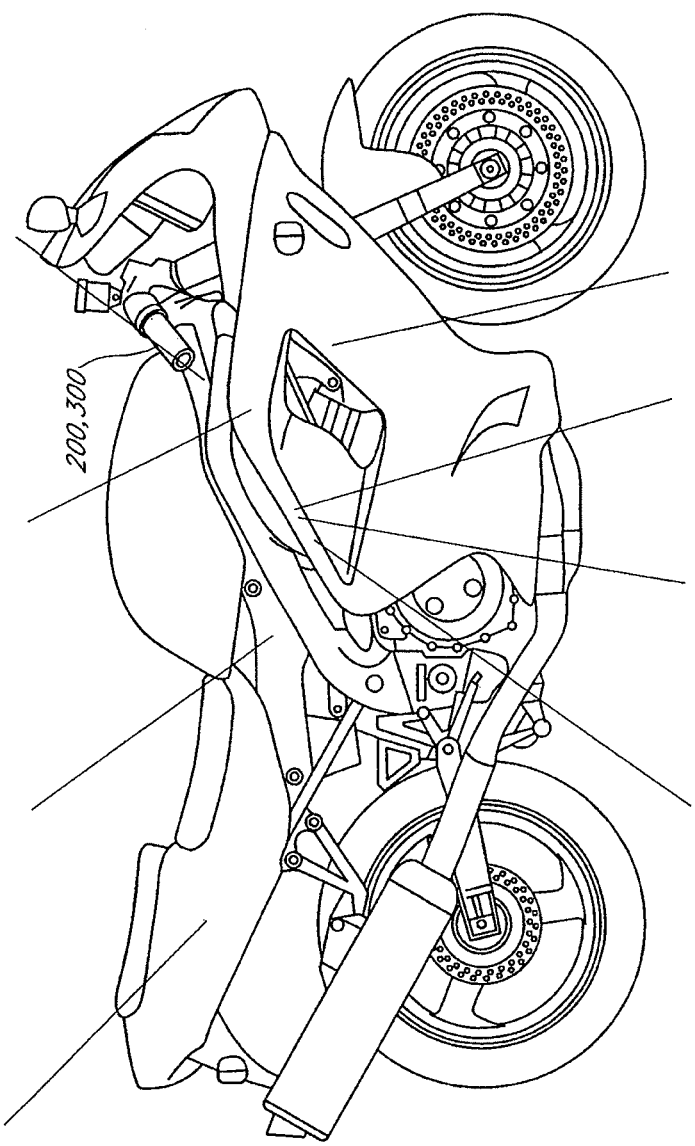
FIG. 6 illustrates one embodiment of various fitments of a vehicle grip control system to a vehicle.

FIG. 6 illustrates a variety of embodiments of placement of the respective components of the system 100 on a vehicle, in this embodiment comprising a motorcycle. In particular, a variety of locations of the vehicle are indicated including under the rear pillion seat, adjacent a battery or air box, underneath a fuel tank, and along structural frame members of the vehicle. FIG. 6 also illustrates the handlebars with the grip assemblies 200, 300 installed. As previously described, interconnection and communication between the grip controls 102 and the interface control module 104 can occur either in a wired or wireless manner. This provides the flexibility to a user of the system 100 to place the control module 104 in a convenient unobtrusive location, for example under the rear pillion seat or fuel tank such that the presence of the system 100 is not readily apparent to a casual observer of the vehicle provided therewith.

Installation of the system 100 also provides the possibility for removing and supplanting existing switch gear which may be provided by an original manufacturer or obviate the need for installation and placement of separate switch gear on a custom made vehicle, such as a motorcycle. This aspect of the system 100 provides the advantage of reducing components and interconnecting wires on the vehicle which can provide a less cluttered, cleaner, more aesthetically desirable appearance to the vehicle as provided with the system 100.

The system 100 also provides a ready manner for installation of controls to a vehicle which may not have been originally provided therewith. For example, as previously mentioned, the grip activated control system 100 can provide control functionality for headlights and directional turn indicators. However certain vehicles, for example, off-road competition motorcycles, may not be originally provided with such operational features by the manufacturer, however a subsequent owner of the vehicles may wish to have such functionality provided to the vehicle and by installation of the system 100 and subsequent connection to operational components such as lights and turn indicators, an owner may provide additional functionality to the vehicle not originally provided by the manufacturer.

The system 100 can also be retrofitted to existing controls to expand or alter the functionality of existing operational aspects of the vehicle. In one embodiment, the signal sensing and logic module is programmable and can provide a self-cancelling feature to turn indicator activation. In this embodiment, upon activation of the left or right turn indicators, if no user cancellation signal occurs within a programmable time period, the system 100 automatically cancels the turn indicator to avoid the safety hazard of the operator failing to cancel the turn indication and continuing to indicate to other drivers that a turn in indicated when none is intended.

In another embodiment, the system 100 can alter the actuation of the vehicle headlights and/or taillights to provide a modulated operation by appropriate actuation of the grip controls 102 and programming of the sensing and logic module. In this embodiment, when a user indicates a desire for this feature, the control module 104 provides appropriate output to the existent vehicle wiring such that the headlights and/or taillights modulate or flicker when activated. Thus the previous operation of the vehicle, in this embodiment comprising steadily illuminated lights, is altered by employment of the system 100, such that the operational aspect is changed to modulating lights.

Illustration and description of the components and operation of the system having been made, reference will now be made again to FIG. 1 for description of additional embodiments of the system 100 which may be implemented as preferred in various applications. As shown in FIG. 1, the system 100 can include a plurality of grip controls 102 embodied as the grip control assemblies 200, 300 and/or the glove control assembly 500 as previously described. The system 100 can also comprise a plurality of the interface or control modules 106. In these embodiments of the system 100, a plurality of different grip controls 102 may communicate at various times with a single control module 106. In this embodiment, a single control module may be fitted to a single vehicle such as a motorcycle, forklift, or utility truck. A plurality of the grip controls, such as the glove control assembly 500 may be connected to the vehicle as fitted with the control module 106 to facilitate operation by a plurality of operators provided with the grip controls 102 of a single vehicle provided with a control module 106. For example, workers in a warehouse may have access or be provided with glove control assemblies 500 with which they can establish communication with the control module 106 as fitted to a forklift vehicle to allow the operators to operate the vehicle. This embodiment provides security and access utility by limiting operational capacity of the vehicle to those authorized or trained personnel having access or being provided with the grip controls 102, such as the glove control assemblies 500, while restricting operational access to others not having the grip controls 102. Thus in this embodiment the system 100 provides a enabling operation function to restrict access to the vehicle to reduce access to the vehicle by those untrained in its use or who may wish to steal or misuse the vehicle.

In another embodiment, a single grip control 102 may communicate with a plurality of the control modules 106 with each of the control modules 106 fitted to a different vehicle. In this embodiment, an owner of multiple vehicles can purchase and install a plurality of the control modules 106 in vehicles in which the owner wishes to provide the system 100 and only a single grip control 102, such as the glove control assembly 500 to achieve the other operating advantages previously described. Thus, an owner and operator of multiple vehicles which are frequently provided by the manufacturers with differing configurations of operational controls among various makes and models of vehicle can effectively standardize or harmonize both the physical configuration as well as the operational functionality of the controls as the single grip control 102 may be transported or exchanged among the vehicles as the owner/operator selects a particular vehicle for use. This embodiment provides both operational convenience and additional safety by providing uniformity of physical arrangement and operation among the different vehicles.

FIG. 1 also illustrates that the control module comprises in this embodiment a wireless receiver receiving wireless signals from the grip controls 102. However, as previously described, the communication between the grip controls 102 and the control modules 106 can comprise a wired connection including a releasable connector in other embodiments. In either of these embodiments, upon receiving input control signals from the grip controls 102, these signals are passed to a signal sensing and logic module of the control module 106. The signal sensing and logic module is adapted to be voltage and time sensitive such that the input controls from the grip controls 102 can comprise changes in voltage alone as well as signals comprised in the relative timing of voltage changes. Also as previously described, the control signals from the grip controls 102 can comprise an order, sequence, simultaneous combination, etc. of the various individual grip controls embodied in the grip control 102. Design and construction of an appropriate signal sensing and logic module is well understood by one of ordinary skill in the art and suitable signal sensing and logic modules are also commercially available.

The signal sensing and logic module is also in communication with output drivers which are connected to the operational controls 110a-110n. Thus, in accordance with the received input signals from the grip controls 102, the signal sensing and logic module interprets or decodes these input signals and induces the output drivers to activate appropriate corresponding operational controls 110a-110n. In this embodiment, the output drivers are configured to provide operating voltages and currents compatible with the existent vehicle wiring and operational equipment of the vehicle. In one embodiment, the output of the control modules 106, e.g., the output of the output drivers, is conducted via wires which are terminated with splice contacts which a user or installer splices into the corresponding vehicle wiring. The contacts terminating the output of the control modules 106 are configured to cut through insulation surrounding existing vehicle wiring and contact the conductor located therein in a ready manner. These contacts are well known in the art and are commercially available. It will also be understood that additional conductors can be provided with the control module 106 including the splice contacts to enable the user or installer to contact the onboard electrical supply of the vehicle, such as the battery to obtain access to operational power and in these embodiments the control module 106 is configured to operate off the vehicle battery power. It will be appreciated that in such embodiments, the control module 106 can be hot connected to the vehicle battery or may be switchable connected to the vehicle battery, such as via the vehicle ignition switch. As previously mentioned, it will also be understood that when hot connected to the vehicle battery, the system 100 can act as a surrogate keyed ignition wherein a particular sequence, combination, timing and/or duration of actuation of one or more of the grip controls can enable the vehicle ignition.

Although the preferred embodiments of the present invention have shown, described and pointed out the fundamental novel features of the invention as applied to those embodiments, it will be understood that various omissions, substitutions and changes in the form of the detail of the device illustrated may be made by those skilled in the art without departing from the spirit of the present invention. Consequently, the scope of the invention should not be limited to the foregoing description but is to be defined by the appended claims.

What is claimed is:

1. A grip control assembly for a vehicle wherein the grip control assembly defines a gripping surface and wherein the grip control assembly comprises one or more grip controls arranged within the gripping surface wherein the grip controls are responsive to pressure applied within the gripping surface such that a user can actuate the grip controls without releasing their grasp of the gripping surface and such that actuation of the grip controls induces a change in corresponding operational aspects of the vehicle, wherein correspondence between the grip controls and the corresponding operational aspects is programmable such that the user can define the correspondence as desired, the grip control assembly further comprising a transmitter which can transmit signals corresponding to actuation of the one or more grip controls.

2. The grip control assembly of claim 1, wherein the one or more grip controls is recessed under the gripping surface so as to inhibit unintentional actuation of the grip controls by the user grasping the gripping surface.

3. The grip control assembly of claim 1, wherein the one or more grip controls comprises a switch.

4. The grip control assembly of claim 1, wherein the grip control assembly is configured to engage with the vehicle such that movement of the gripping surface initiates steering changes to the vehicle.

5. The grip control assembly of claim 1, wherein at least one grip control is adapted to induce changes in the corresponding operational aspects of the vehicle in a toggle manner.

6. The grip control assembly of claim 1, wherein at least one grip control is configured such that a first actuation pattern induces first changes in corresponding operational aspects of the vehicle and a second actuation pattern induces second changes in corresponding operational aspects of the vehicle.

7. The grip control assembly of claim 6, wherein the first and second activation patterns comprise different numbers of actuation of the at least one grip control.

8. The grip control assembly of claim 6, wherein the first and second activation patterns comprise different lengths of time of actuation of the at least one grip control.

9. The grip control assembly of claim 6, wherein the first and second activation patterns comprise different intervals between subsequent actuations of the at least one grip control.

10. The grip control assembly of claim 6, wherein the first and second activation patterns comprise actuation of different combinations of a plurality of grip controls.

11. The grip control assembly of claim 6, wherein the first and second changes are in the operation of the same operational aspect of the vehicle.

12. The grip control assembly of claim 1, wherein the assembly is configured such that rotation of the gripping surface induces a throttle control to the vehicle.

13. The grip control assembly of claim 1, wherein the assembly is configured such that the gripping surface having the one or more grip controls arranged within the gripping surface is configured for gripping and operation of the one or more grip controls by a single of a user's right or left hand as selected by the user.

14. The grip control assembly of claim 1, comprising a plurality of grip controls displaced longitudinally about the gripping surface.

15. The grip control assembly of claim 1, comprising a plurality of grip controls displaced circumferentially about the gripping surface.

16. The grip control assembly of claim 1, wherein the gripping surface is contoured to indicate the location of the one or more grip controls.

17. The grip control assembly of claim 1, wherein the assembly is configured to supplement at least certain pre-existing controls of the vehicle.

18. The grip control assembly of claim 17, wherein the assembly is adapted to provide new control of operational aspects of the vehicle not provided by the pre-existing controls.

19. The grip control assembly of claim 1, wherein at least certain changes in operational aspects of the vehicle are automatically induced by the assembly.

* * * * *